(12) United States Patent
Harrand

(10) Patent No.: US 9,064,092 B2
(45) Date of Patent: Jun. 23, 2015

(54) EXTENSIBLE NETWORK-ON-CHIP

(75) Inventor: Michel Harrand, Saint Egreve (FR)

(73) Assignee: KALRAY, Orsay (FR)

( * ) Notice: Subject to any disclaimer, the term of this patent is extended or adjusted under 35 U.S.C. 154(b) by 510 days.

(21) Appl. No.: 13/572,213

(22) Filed: Aug. 10, 2012

(65) Prior Publication Data

US 2013/0054811 A1 Feb. 28, 2013

(30) Foreign Application Priority Data

Aug. 23, 2011 (FR) ...................... 11 57471

(51) Int. Cl.
*G06F 13/36* (2006.01)
*G06F 15/78* (2006.01)

(52) U.S. Cl.
CPC .................. *G06F 15/7825* (2013.01)

(58) Field of Classification Search
CPC ...... G06F 21/85; G06F 13/36; G06F 15/7825
USPC .......................................................... 710/314
See application file for complete search history.

(56) References Cited

U.S. PATENT DOCUMENTS

| | | | | |
|---|---|---|---|---|
| 4,942,517 A | * | 7/1990 | Cok | 712/11 |
| 5,134,690 A | * | 7/1992 | Samatham | 710/317 |
| 5,689,647 A | * | 11/1997 | Miura | 712/11 |
| 5,689,661 A | | 11/1997 | Hayashi et al. | |
| 5,701,434 A | * | 12/1997 | Nakagawa | 711/157 |
| 5,892,962 A | * | 4/1999 | Cloutier | 712/16 |
| 6,205,532 B1 | * | 3/2001 | Carvey et al. | 712/1 |
| 6,680,915 B1 | * | 1/2004 | Park et al. | 370/254 |
| 8,340,517 B2 | * | 12/2012 | Shacham et al. | 398/46 |
| 2006/0268909 A1 | * | 11/2006 | Langevin et al. | 370/405 |
| 2007/0140280 A1 | * | 6/2007 | Rhim et al. | 370/406 |
| 2009/0323540 A1 | * | 12/2009 | Goossens et al. | 370/252 |
| 2010/0111088 A1 | * | 5/2010 | Olofsson | 370/392 |
| 2010/0158005 A1 | * | 6/2010 | Mukhopadhyay et al. | 370/392 |
| 2011/0058569 A1 | | 3/2011 | Harrand | |
| 2014/0237156 A1 | * | 8/2014 | Regula et al. | 710/314 |

OTHER PUBLICATIONS

Kouadri et al., "Networks-In-Package: Performances Management and Design Methodology," TIMA Laboratory—System Level Synthesis Group (2008).

* cited by examiner

*Primary Examiner* — Paul R Myers
(74) *Attorney, Agent, or Firm* — Oliff PLC

(57) ABSTRACT

An integrated circuit comprises compute nodes arranged in an array; a torus topology network-on-chip interconnecting the compute nodes; and a network extension unit at each end of each row or column of the array, inserted in a network link between two compute nodes. The extension unit has a normal mode establishing the continuity of the network link between the two corresponding compute nodes, and an extension mode dividing the network link in two independent segments that are accessible from outside the integrated circuit.

12 Claims, 3 Drawing Sheets

Fig 3
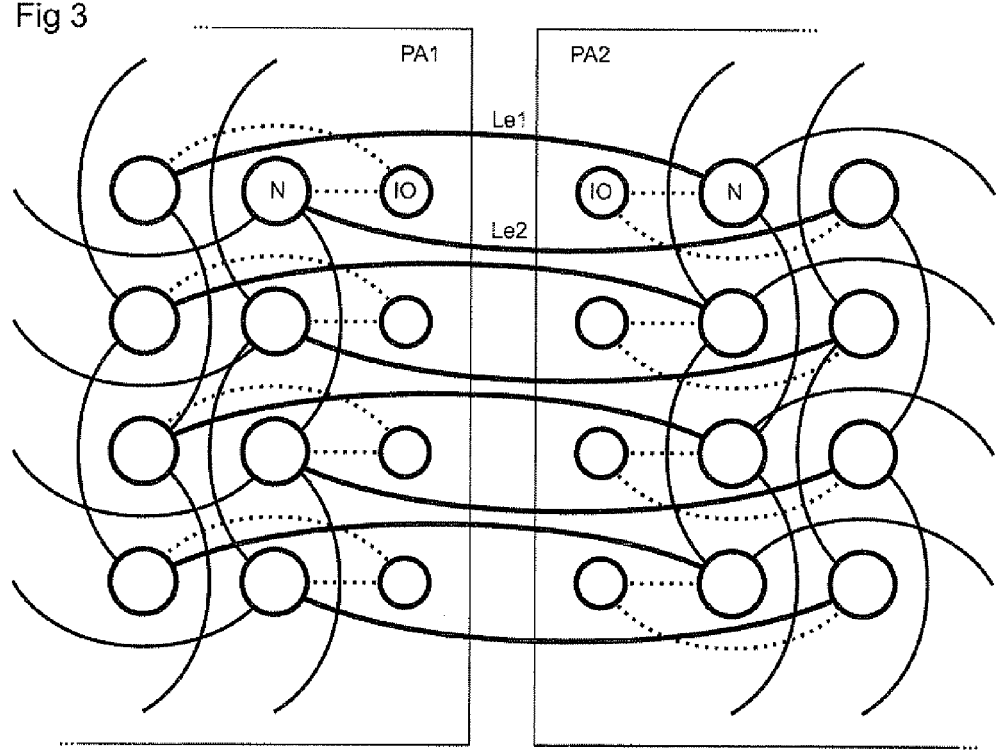
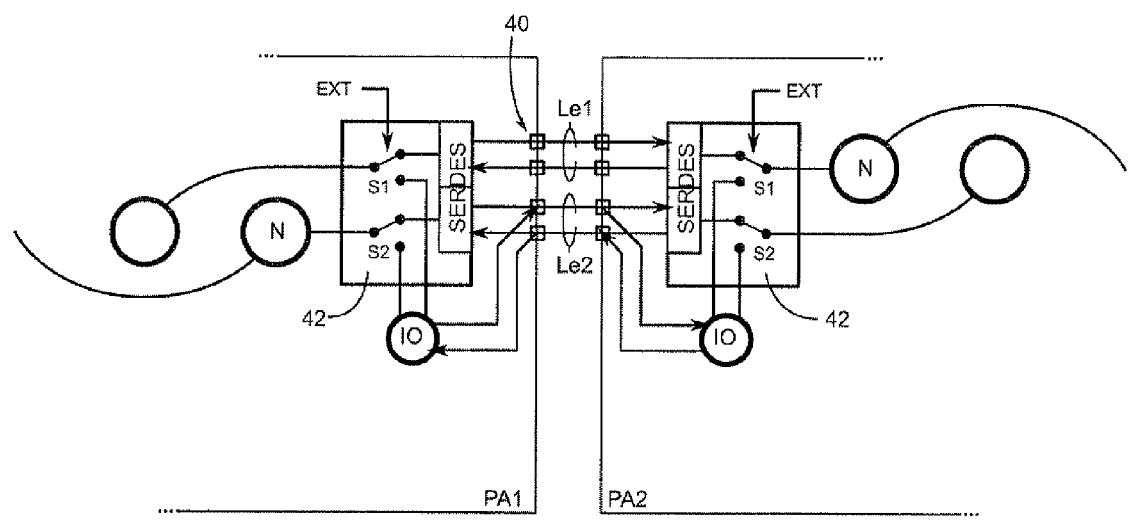
Fig 4

EXTENSIBLE NETWORK-ON-CHIP

FIELD OF THE INVENTION

The invention relates to integrated processor arrays, wherein the processors are interconnected by networks-on-chip (NoCs). The invention relates more particularly to a processor array architecture having such regularity that development tools may adapt to the number of processors of the array with minimal assistance from the programmer.

BACKGROUND OF THE INVENTION

FIG. 1 schematically shows a processor array PA including 4×4 compute nodes N arranged in a network-on-chip of folded torus topology, as described in patent application US 20110058569. In an array topology, each node is connected to two other nodes in the same row and to two other nodes in the same column, through point-to-point bidirectional links. In a torus topology, the nodes of the array are also connected in a loop in each row and in each column, so that all nodes have the same physical structure as to their interconnections, including the nodes located at the edges of the array. In a folded topology, which is represented in FIG. 1, each node (unless it is located on the edge of array) is connected to two other nodes of same parity in the row and the column, so the links between nodes have substantially the same length.

Each node N includes a five way router which manages the four links, say North, South, East and West links, with the next nodes in the row and the column, and a link with a processing unit, for example a cluster of processors interconnected through a shared bus.

The processor array PA is fabricated as a single integrated circuit. To communicate with the outside world, it includes input/output IO units inserted in the network-on-chip at the edges of the array. As shown, such an IO unit may be provided at both ends of each row and each column. More specifically, each unit is inserted in the link connecting two extreme nodes N of a same row or a same column.

Each IO unit has a three-way router that manages the two links with nodes N and a link with an input/output interface. The input/output interface allows communication with the outside of the circuit through metal pads of the integrated circuit, intended to be put in contact with conductive tracks of a printed circuit board or other substrate.

To facilitate the programming of such a processor array, all compute nodes N have similar characteristics, allowing a development tool to map tasks, in automatic mode, on any of the nodes. To achieve this, the IO units are designed to be transparent to the internal communications of network-on-chip. Patent application US 20110058569 also describes a solution to reduce the latency through the routers of the IO units for internal communications.

For the purpose of standardization in marketing integrated circuits, the sizes of the processor array will be offered in a relatively narrow range. Thus, the computing power delivered by the largest array of the range is likely to be insufficient for more demanding applications.

SUMMARY OF THE INVENTION

There is thus a need for offering more computing power than that available in the largest processor array of a range. There is a corollary need for increasing the computing power without changing existing development tools for processor arrays.

These needs are addressed by an integrated circuit comprising compute nodes arranged in an array; a torus topology network-on-chip interconnecting the compute nodes; and a network extension unit at each end of each row or column of the array, inserted in a network link between two compute nodes. The extension unit has a normal mode establishing the continuity of the network link between the two corresponding compute nodes, and an extension mode dividing the network link in two independent segments that are accessible from outside the integrated circuit.

According to an embodiment, the network link comprises a parallel bus and the extension unit comprises, for a segment, a parallel/series converter forming an outgoing serial channel for transmitting in series on a first external terminal of the circuit data presented in parallel on the segment; and a series/parallel converter forming an incoming serial channel for transmitting in parallel on the segment data arriving in series on a second external terminal of the integrated circuit.

According to an embodiment, the integrated circuit comprises input/output interfaces located in the links between compute nodes at the ends of the rows or columns, and configured to communicate with the outside of the integrated circuit through input/output terminals, wherein the extension units are configured, in extension mode, to connect said input/output terminals to said segments.

According to an embodiment, the integrated circuit comprises a load balancer common to the extension units of a same edge of the array, configured to allocate available outgoing serial channels between the segments for which a outgoing transmission is in progress.

According to an embodiment, the load balancer is configured for inserting in a header of each outgoing serial transmission, an identification of the originating segment.

According to an embodiment, the load balancer is configured to parse the header of each incoming serial transmission, and switch the corresponding serial channel to the segment identified in the header.

According to an embodiment, the serial channels transmit data in packets and include queues for storing packets awaiting transmission, the load balancer being configured for routing packets to the serial channels having the least full queues.

BRIEF DESCRIPTION OF THE DRAWINGS

Other advantages and features will become more clearly apparent from the following description of particular embodiments of the invention provided for exemplary purposes only and represented in the appended drawings.

FIG. 3 illustrates a desirable interconnection between two adjacent arrays of the macro-array, enabling an extension of the network while preserving topology.

FIG. 4 shows an embodiment of network extension units.

DETAILED DESCRIPTION OF THE PREFERRED EMBODIMENTS

Figure 1:
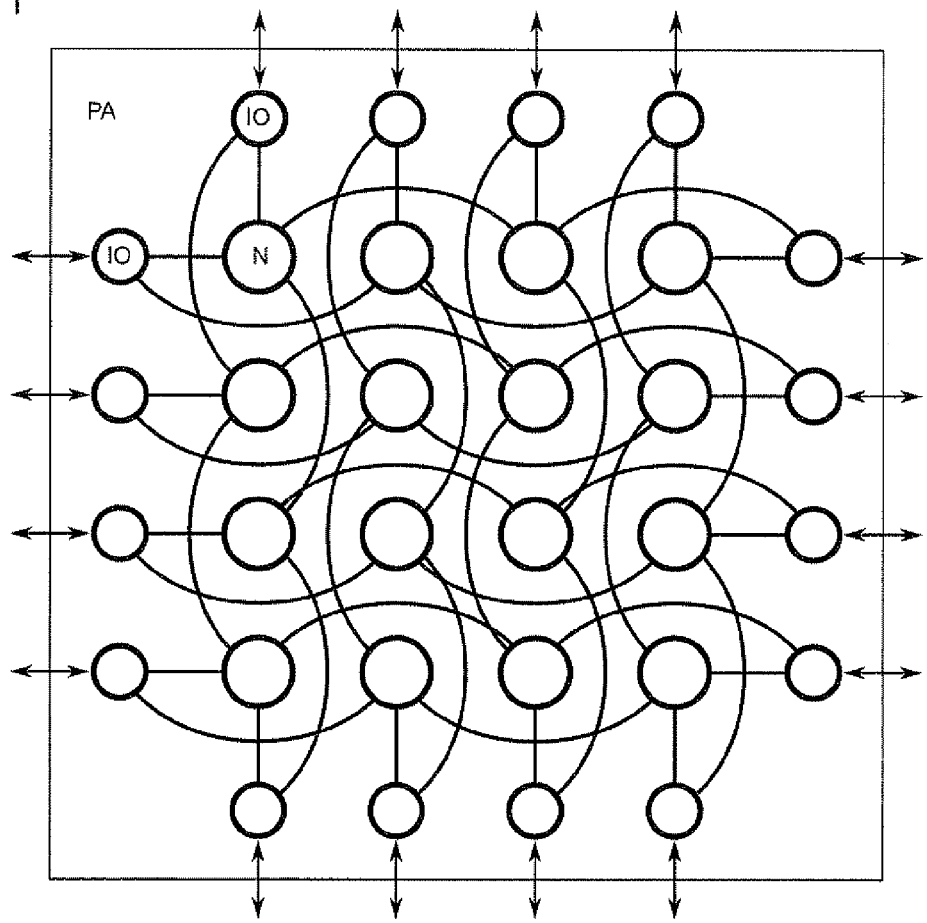
FIG. 1, previously described, represents a processor array interconnected by a network-on-chip of folded torus topology.
Figure 2:
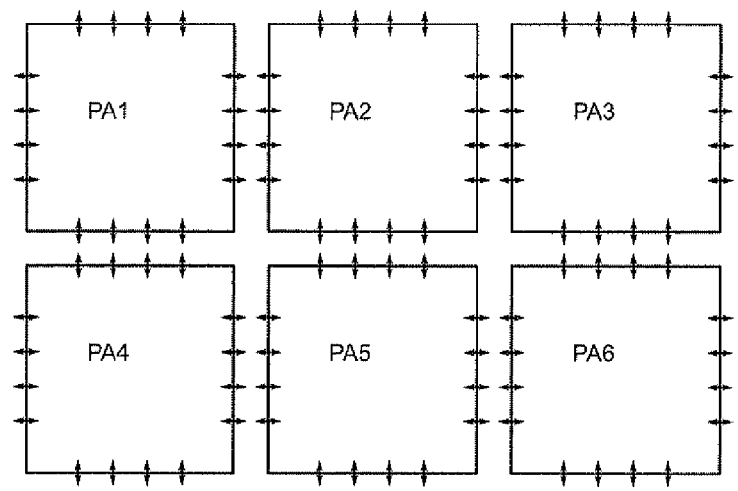
FIG. 2 illustrates a macro-array formed of multiple processor arrays.

FIG. 2 shows a possible solution for increasing the available computing power when that provided by a single processor array, in the form of a standard integrated circuit, is insufficient. As shown, several processor arrays PA1, PA2 . .

are assembled on a substrate, such as a printed circuit board, in a macro-array of sufficient size to achieve the required computing power.

Each PA array could be programmed and used independently, but this would involve efforts on the part of the programmer to split the tasks in independent and balanced subtasks in terms of computing power. An operating system would also need to run outside the arrays to distribute the subtasks between arrays, while an array is normally designed to run its own operating system and therefore be autonomous.

To avoid this complexity, it is desired that the macro-array be considered, from the point of view of the development tool, as one and only processor array. To achieve this, it is preferable that the compute nodes of all the PA arrays form together one and only network.

A possible solution for this is to connect the PA arrays to each other by their input/output interfaces and emulate two-way network connections between the interfaces of two adjacent arrays. Such emulation nevertheless involves extra software complexity that depends on the size and the number of arrays forming the macro-array.

In addition, this solution would require that the input/output interfaces are all identical and that the ends of all the rows and columns are fitted with such interfaces. In practice, a standard processor array would have a limited number of input/output interfaces, and these would be different.

FIG. 3 illustrates, in the context of folded torus topology arrays, the type of connection desired between two adjacent arrays, PA1 and PA2, allowing the networks-on-chip of the two arrays to form a single network, of same topology. The shown example corresponds to an extension of the network through the rows of the array—it should be noted that the same principle applies to the columns.

In each row of the array PA1, the links of the last two nodes N with their input/output units IO are open (if there is no IO unit at this location, it is the link between the last two nodes which is open). Similarly, in the homologous row of array PA2, the links between the first two nodes N with their input/output units IO are open (if there is no IO unit at this location, it is the link between the first two nodes which is open). The internal links thus opened, shown by dotted lines, are replaced by external links Le1 and Le2, ensuring a junction of a row of array PA1 with an homologous row of array PA2 while forming an expanded row of same topology as the internal rows. To achieve this, link Le1 connects the before-last node of the row of array PA1 to the first node of the row of array PA2, and link Le2 connects the last node of the row of array PA1 to the second node of the row of array PA2.

In a practical implementation, each internal link thus "replaced" by an external link is divided into two segments made accessible independently from outside. Thus, the internal link between two end-most nodes of a row, in some cases crossing an input/output unit IO, is divided into two segments to connect with homologous segments of the adjacent circuit, respectively by the external links Le1 and Le2.

Note that a folded torus topology is particularly well suited to this expansion. Indeed, the two nodes affected by external links in each row of an array happen to be those nearest to the edge.

Also note that the IO units of the facing edges of arrays PA1 and PA2 are no longer used. This is consistent with the desire to create a macro-array having the same topology as the individual arrays, where the IO units are at the periphery, It is thus possible to expand rows and columns over several adjacent PA circuits, in a configuration where the expanded columns and rows have the same, folded torus topology as the rows and columns of an individual PA circuit.

A macro-array thus formed can be programmed using the same development tool than that of a conventional PA array. Indeed, given the regularity of the conventional array and the interchangeability of nodes N, the development tool need only be configured with the dimensions of the array to map tasks, in an automated manner, on different nodes and build a communication diagram between the nodes through the network-on-chip. In the case of a macro-array having throughout the topology of a conventional array, the existing development tool need only be configured with the new dimensions of the macro-array in terms of compute nodes.

FIG. 4 shows a detailed embodiment of a structure for establishing the external connections Le1 and Le2 between two rows of two adjacent arrays PA1 and PA2. Usually the internal links between nodes N are buses having many conductive lines. It is not practically feasible to extend these buses by external links Le1 and Le2 having as many lines, since the integrated circuits incorporating the arrays would not dispose of enough external contact terminals in most cases. To avoid this complication, each external link Le1, Le2 is provided in the form of a fast serial link. In fact, since the internal links are bidirectional, each external link Le1, Le2 comprises two serial links of opposite directions, as shown. Each external link Le1, Le2 then only requires two contact terminals 40 on each integrated circuit PA. These terminals may be taken from the unused input/output interfaces IO, as shown for link Le2.

By adequately placing terminals 40, i.e. so that the terminals to interconnect between two adjacent circuits PA are face to face, the circuits can be placed near each other to shorten the conductive tracks for the serial links between the circuits. By thus shortening the tracks (to the order of the millimeter), and since the serial interfaces do not need to follow standards, particularly high transmission rates can be reached for the serial signals, of the order of 10 Gb/s.

Each end of the rows and columns of an array PA is equipped with an extension unit 42. Unit 42 includes a serial/parallel/serial converter (SERDES) for each external link Le1, Le2—it converts internal parallel data to a serial stream on the outgoing serial link, and converts serial incoming data to a parallel internal data flow. The parallel flows pass through switches S1, S2, respectively associated with the external links Le1, Le2. The switches S1 and S2 are controlled by a network extension signal EXT.

When signal EXT is inactive, unit 42 is in a normal mode. The switches S1 and S2 connect an end pair of nodes N to their input/output unit 10, in the conventional standalone configuration of array PA. Where there is no unit 10, there is a direct link between switches S1 and S2.

When the signal EXT is active, unit 42 is in "network extension" mode. The switches S1 and S2 connect the pair of nodes to their respective SERDES converters, placing circuit PA in the configuration of FIG. 3.

Signal EXT is preferably common to all extension units 42 of a same edge of circuit PA. Four signals EXT are thus provided per circuit PA, for independently controlling extension units 42 on each edge of the circuit, based on the location of the circuit PA in the macro-array. The states of signals EXT are stored, for example, in a programmable configuration register.

Although fast serial connections can be achieved between two adjacent PA circuits, in some cases they will not achieve the flow rate of internal parallel links. Then, the extended network may have a bandwidth limitation at the frontier between two PA circuits, whereby the performance achieved by the macro-array may not be proportional to the number of PA circuits.

Figure 5:
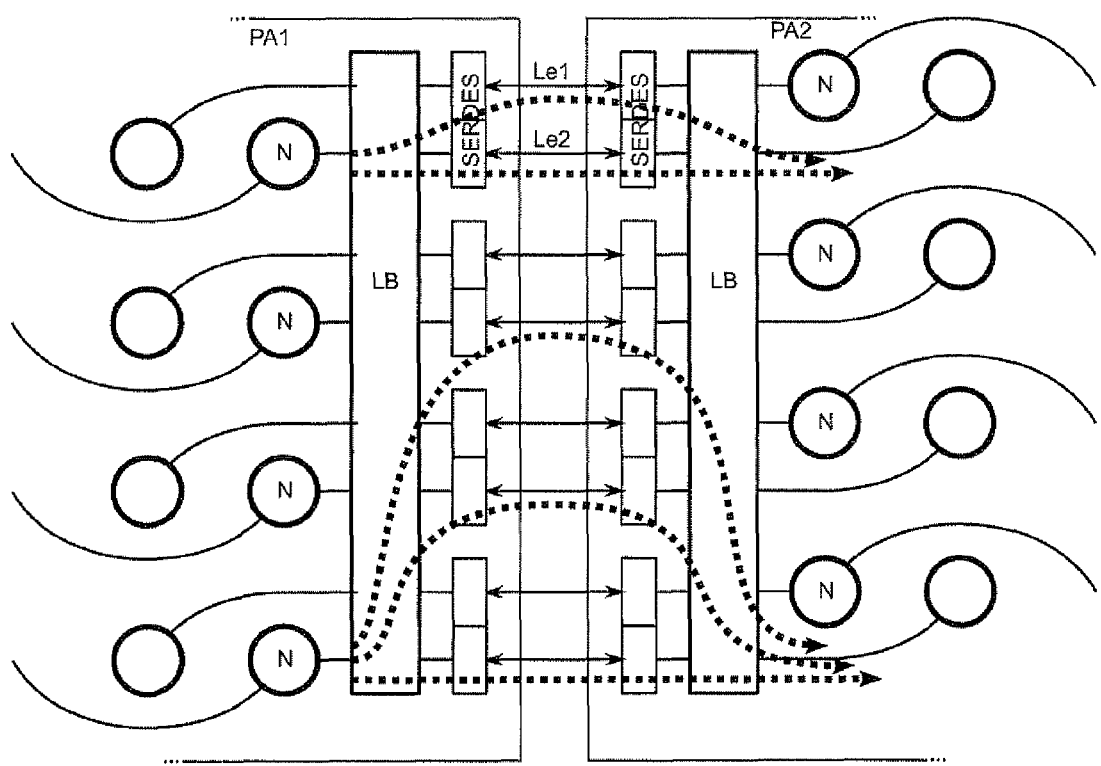
FIG. 5 shows another embodiment of network extension units.

FIG. 5 shows an embodiment for increasing the average bandwidth at the frontier between two PA circuits. In this figure, units 42 are shown in their "network extension" mode—the elements used in the normal mode are not shown, including the units 10, for sake of clarity. This embodiment aims to optimize the use of the external links and it is based on the assumption that the useful bandwidth is often unevenly distributed between the links, in particular between the outgoing links. The bandwidth of the outgoing serial channels is allocated dynamically between effective outgoing transmissions. For each row (or column), there are two outgoing channels at the same edge of the circuit, associated respectively with the external serial links Le1 and Le2. If a PA circuit has M rows (or columns), there are 2 M outgoing serial channels on one edge of the circuit.

The switches S1 and S2 of all extension units 42 of an edge of the array are replaced by a load balancer LB that is responsible for switching outgoing parallel flows to one or more SERDES converters, depending on the availability of the outgoing serial channels.

In the example of FIG. 5, a transmission exiting the first row through link Le2 borrows in parallel the available outgoing channel of link Le1. Load balancing is achieved for example by packets: some packets from the top right node of circuit PA1 take link Le1 while others take link Le2.

The figure also shows a transmission exiting through link Le2 of the fourth row, that borrows in parallel the outgoing channels of the links Le2 of the second and third rows.

A serial transmission is usually packetized. Each serial channel has a transmission queue in which the packets to transmit are stacked. Determination of the serial channels that can be allocated to load balancing may, for example, be achieved using the queue fill levels of the channels: an outbound packet will be routed to the least full queue on its arrival in the load balancer.

A part of the load balancing functionality, carried out by the transmitting PA circuit (PA1), has just been described. The remaining part of the functionality is carried out by the load balancer LB of the receiving circuit (PA2). The load balancer of the transmitting circuit, i.e. the one (PA1) that allocated the outgoing serial channels, identifies ongoing transmissions and their internal links of origin. The load balancer of the receiving circuit (PA2) retrieves the identification information and redirects the incoming serial channels to the identified internal links.

The identification information may be inserted in headers included in the serial transmissions, in conformity with standard serial transmission protocols, such as the Interlaken protocol.

If circuit PA2 has data to transmit to circuit PA1, transmission is achieved by reversing the roles described for circuits PA1 and PA2. The transmissions in one direction and the other borrow separate serial channels, whereby both transmissions can be carried out at the same time and independently.

By using a dynamically operating load balancer LB, as just explained, it is possible to provide fewer bidirectional serial channels than internal links. In some applications, it may be sufficient to provide, for example, one bidirectional serial channel for two or four internal links. This reduces the number of external terminals of the circuit, and especially the surface area occupied by the SERDES converters. The load balancer will operate in the same manner as described above; it will only have a smaller pool of serial channels to allocate.

Embodiments of networks-on-chip extensible from outside have been presented in the context of achieving unlimited extensibility of a processor array while maintaining compatibility with existing development tools designed for individual circuits. These development tools need only be configured with the size of the extended array.

It is not excluded that the development tools may evolve to take into account the specificities of the external links between circuits. In this case, instead of using a load balancer to route outgoing packets dynamically, serial channels can be allocated statically upon programming, using routing information placed in the headers of the packets. The load balancer is replaced by a router that directs packages to serial channels based on the information in the headers.

What is claimed is:

1. An integrated circuit comprising:
    compute nodes arranged in an array;
    a torus topology network-on-chip interconnecting the compute nodes through parallel bus links;
    a network extension unit at each end of each row or column of the array, inserted in the bus between two compute nodes, the extension unit having a normal mode establishing the continuity of the bus between the two corresponding compute nodes, and an extension mode dividing the bus in two independent bus segments;
    a set of parallel/series converters forming each an outgoing serial channel for transmitting in series on a first external terminal of the circuit data presented in parallel on a bus segment;
    a set of series/parallel converters forming each an incoming serial channel for transmitting in parallel on a bus segment data arriving in series on a second external terminal of the circuit; and
    a load balancer common to the extension units of a same edge of the array, configured to allocate available outgoing serial channels between the bus segments for which an outbound transmission is in progress.

2. The integrated circuit of claim 1, wherein said terminals of the circuit are, in normal mode, connected to input/output interfaces located on links between compute nodes at the ends of the rows or columns.

3. The integrated circuit of claim 1, wherein the load balancer is configured to insert in a header of each outgoing serial transmission an identifier of the originating bus segment.

4. The integrated circuit of claim 3, wherein the load balancer is configured to parse each incoming serial transmission header and switch the corresponding serial channel to the bus segment identified in the header.

5. The integrated circuit of claim 1, wherein the serial channels transmit data by packets and include queues for packets awaiting transmission, the load balancer being configured to route packets to the serial channels having the least full queues.

6. An integrated circuit comprising:
    compute nodes arranged in an array;
    a torus topology network-on-chip interconnecting the compute nodes; and
    a network extension unit at each end of each row or column of the array, inserted in a network link between two compute nodes, the extension unit having:
        a normal mode establishing the continuity of the network link between the two corresponding compute nodes, and
        an extension mode dividing the network link in two independent segments that are accessible from outside the integrated circuit.

7. The integrated circuit of claim 6, wherein the network link comprises a parallel bus and the extension unit comprises, for a segment:

a parallel/series converter forming an outgoing serial channel for transmitting in series on a first external terminal of the circuit data presented in parallel on the segment; and a series/parallel converter forming an incoming serial channel for transmitting in parallel on the segment data arriving in series on a second external terminal of the integrated circuit.

8. The integrated circuit of claim 6, comprising input/output interfaces located in the links between compute nodes at the ends of the rows or columns, and configured to communicate with the outside of the integrated circuit through input/output terminals, wherein the extension units are configured, in extension mode, to connect said input/output terminals to said segments.

9. The integrated circuit of claim 7, comprising a load balancer common to the extension units of a same edge of the array, configured to allocate available outgoing serial channels between the segments for which a outgoing transmission is in progress.

10. The integrated circuit of claim 9, wherein the load balancer is configured for inserting in a header of each outgoing serial transmission, an identification of the originating segment.

11. The integrated circuit of claim 10, wherein the load balancer is configured to parse the header of each incoming serial transmission, and switch the corresponding serial channel to the segment identified in the header.

12. The integrated circuit of claim 9, wherein the serial channels transmit data in packets and include queues for storing packets awaiting transmission, the load balancer being configured for routing packets to the serial channels having the least full queues.

* * * * *